T. W. MILLER.
MANUFACTURE OF RUBBER BANDS.
APPLICATION FILED FEB. 28, 1914.
1,155,325.
Patented Sept. 28, 1915.
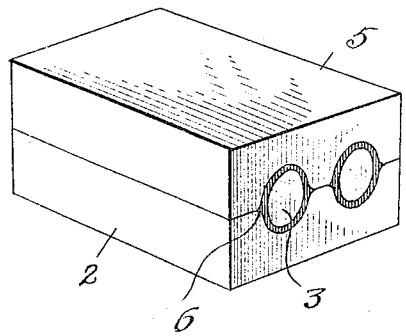
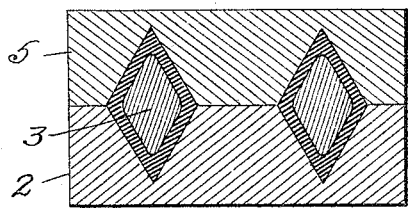
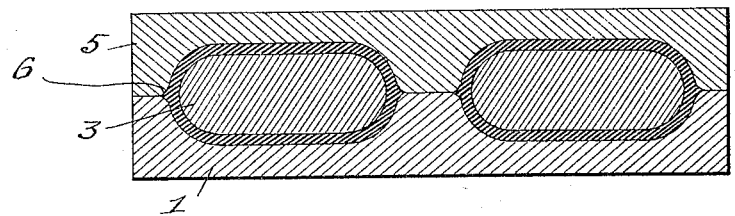
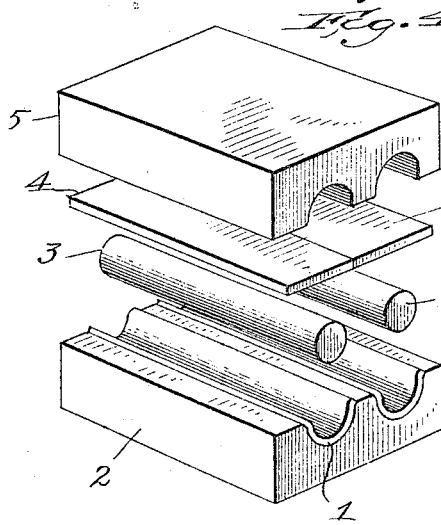
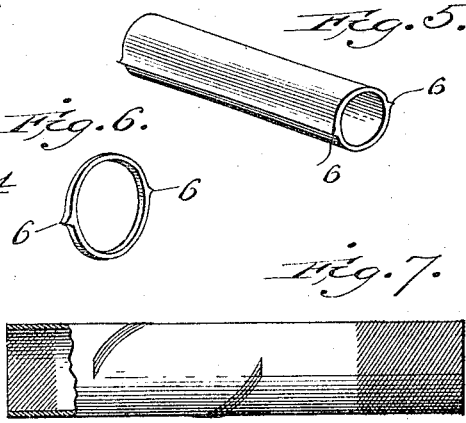
Witnesses
Edwin L. Yewell
A. L. Mills
Inventor
Thomas W. Miller
By Percy B. Hills
Attorney

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

MANUFACTURE OF RUBBER BANDS.

1,155,325.  Specification of Letters Patent.  Patented Sept. 28, 1915.

Application filed February 25, 1914. Serial No. 821,704.

*To all whom it may concern:*

Be it known that I, THOMAS W. MILLER, a citizen of the United States, residing at Ashland, in the county of Ashland and State of Ohio, have invented certain new and useful Improvements in the Manufacture of Rubber Bands, of which the following is a specification.

My invention relates to the manufacture of elastic rubber bands, and has for its object to provide an improved and simplified method of making the same.

Heretofore two methods of manufacturing rubber bands have been employed. The first of these consists in preparing the stock in mills in the usual manner, then calendering the stock to the required thickness, then cutting it to the required width, seaming it, and placing it on a mandrel to be cured, usually in open steam. After this curing or vulcanizing, the tubes so formed are slipped off the mandrel and cut into bands of the desired width by means of a suitable cutting machine. The other method is to run the stock through a tube machine, just as rubber tubing is manufactured, and then slipping the same onto a mandrel and curing or vulcanizing it in any suitable manner. The tubes so formed may then be cut into bands of the desired width.

My improved process consists in preparing the stock in the mill in the usual manner, then placing in the bottom mold cavity of a suitable two-part mold, a piece of the stock of suitable size, then placing a core in position in said mold, then placing a similar piece of the stock on the upper face of the core, then applying the upper plate of the mold containing a suitable half cavity, then placing the mold in a press, and by using a high pressure under heat flowing the stock together into a seamless tube, which, after the vulcanization or curing is completed while in the mold, may be removed therefrom and is ready to be cut into bands of the required width.

To more clearly illustrate my improved method, reference is had to the accompanying drawing, in which:

Figure 1 is a perspective view of a mold assembled with the stock therein. Fig. 2 is a transverse sectional view of a mold, the mold cavities and the cores being of a little different shape. Fig. 3 is a view similar to Fig. 2, showing still another shape. Fig. 4 is a perspective view showing the mold sections, the cores, and the strips of rubber in the act of being assembled. Fig. 5 is a detail perspective view of one of the tubes formed in using the mold shown in Figs. 1 and 4. Fig. 6 is a similar view showing a band cut from the tube shown in Fig. 5. Fig. 7 is a side elevation, partly in section, of a tube disclosing a modified construction.

Referring more particularly to Fig. 4 of the said drawing, it will be seen that the strips of rubber 1 are placed in the cavities of the lower mold section 2, the cores 3 then positioned therein, the upper strips of rubber 4 then placed upon the upper surface of said cores, and the upper mold sections 5 then placed in position, the result being to assemble the mold as shown in Fig. 1, the same then being ready for insertion into a hydraulic or other press, where a high pressure is applied, as well as the vulcanizing heat. In order that a perfect union between the upper and lower strips of rubber may be effected in this mold, I form the lower and upper mold sections 2 and 5 slightly beveled at the point of registration, the result being that the tubes formed therein are slightly thickened or reinforced along the lines of juncture of the rubber strips, as best seen at 6 in Figs. 1, 5 and 6. This reinforcement may be left on the tubes when cut into rubber bands, or if desired may be trimmed off. It is desirable, however, that such thickening or reinforcing along these lines be provided for, in order that there may be a homogeneous union of the strips of rubber into a tube.

The construction shown in Figs. 2 and 3 differs from those heretofore described only in the shape imparted to the finished tubes, and this may be varied in any manner desired without departing from the spirit of the invention.

In Fig. 7 I have shown a modified construction of a tube, the same being embossed or roughened on its inner or outer surface, or both, which readily may be accomplished by embossing the surfaces of the cavities in the mold sections, as well as the surface of the cores 3, which will impart such embossing to the surface of the rubber. This provides an embossed surface or surfaces for the bands when cut, which will increase their resistance to lateral movement when being used.

Having thus described my invention, what I claim as new and desire to secure by Letters Patent is:—

1. The process of making elastic rubber bands, which consists in assembling the rubber in suitable form in a tube mold, simultaneously applying pressure and heat to the mold to unite and vulcanize the rubber into a tube, and finally cutting said tube into rubber band widths.

2. The process of making elastic bands, which consists in assembling suitable pieces of rubber in a tube mold, applying pressure and heat to the mold to unite the edges of said pieces into a tube and to vulcanize the same, and finally cutting said tube into rubber band widths.

3. The process of making elastic rubber bands, which consists in assembling the rubber in a tube mold, applying pressure and heat to the mold to unite and vulcanize the rubber into a tube having a thickened portion along its united edge, and finally cutting said tube into rubber band widths.

4. The process of making elastic rubber bands, which consists in assembling suitable pieces of rubber in a tube mold, applying pressure and heat to the mold to unite the edges of said pieces into a tube having said united edges thickened and to vulcanize the same, and finally cutting said tube into rubber band widths.

In testimony whereof I have hereunto set my hand in the presence of two subscribing witnesses.

THOMAS W. MILLER.

Witnesses:
    PERCY B. HILLS,
    I. L. MILLER.